Feb. 28, 1961 G. H. CALVERT 2,973,498
SUPPORT FOR HEATING ELEMENTS
Original Filed Jan. 3, 1957
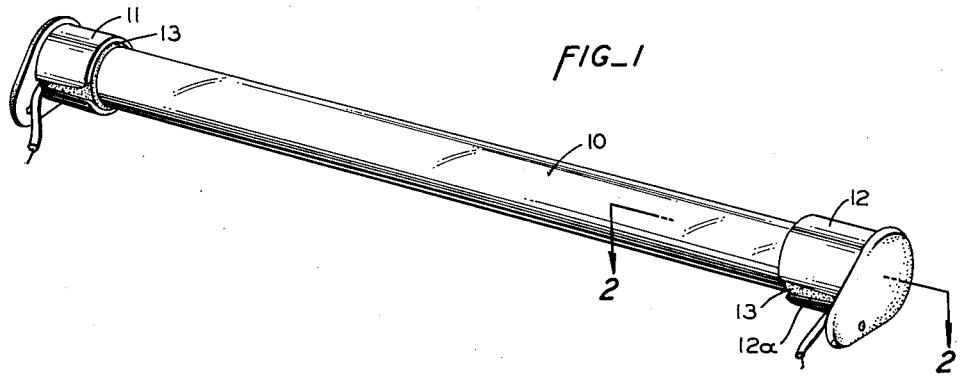
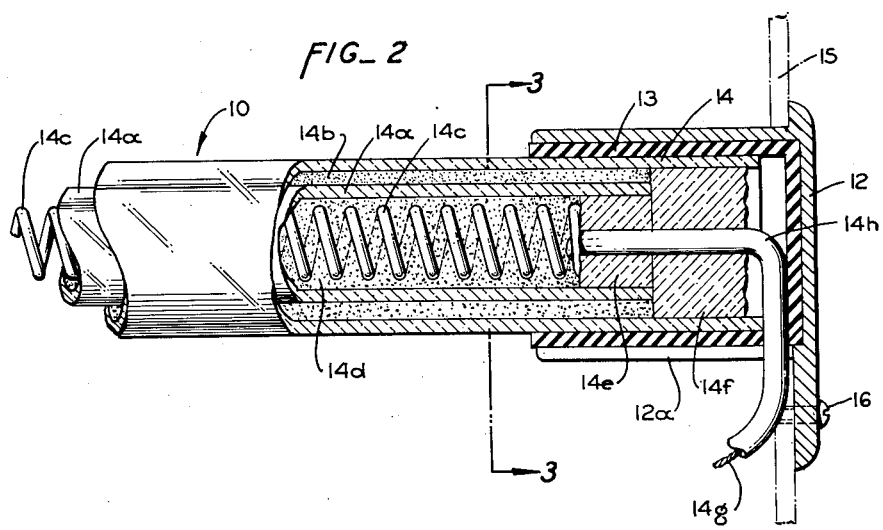
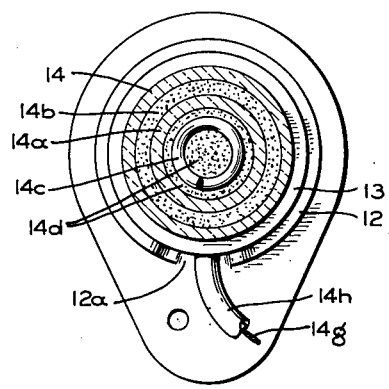
INVENTOR.
GRESHAM H. CALVERT
BY
*Allen and Cheney*
*his* ATTORNEYS

United States Patent Office 2,973,498
Patented Feb. 28, 1961

2,973,498
SUPPORT FOR HEATING ELEMENTS
Gresham H. Calvert, 4105 Soquel, Soquel, Calif.
Substituted for abandoned application Ser. No. 632,385, Jan. 3, 1957. This application June 7, 1960, Ser. No. 34,595

2 Claims. (Cl. 338—296)

This invention relates to heating elements in general. More particularly this invention relates to an improved support for heating elements.

This application is a re-file of my application S.N. 632,385, filed Jan. 3, 1957, now abandoned.

An object of this invention is to provide an improved support for tubular type heating units such that said units are protected against mechanical shock that might be transmitted thereto through the support.

Another object of this invention is to provide an improved mechanical and electrical shock insulating support for heating units that include tubular members of frangible material which are to be supported in a reflector for radiant heating.

A further object of this invention is to provide an improved support for tubular type radiant heaters in which silicone rubber cap-shaped inserts are employed in caps positioned on the ends of the tubular member for supporting it in a suitable reflector or housing.

Other and further objects of this invention will be apparent to those skilled in the art to which it relates from the following specification, claims and drawing.

In accordance with this invention there is provided an improved supporting means for the tubular type heat-generating elements of electric heaters. The type of heater with which this invention is adapted to be employed is disclosed in my Patent No. 2,874,256, issued February 10, 1959. This heater briefly comprises a helical resistance element that is positioned inside of a tubular member and is provided with end plugs through which suitable connections to the heating element are led to the outside of the tubular member. Caps made of silicone rubber are placed on the ends of the tubular member and these silicone rubber caps are in turn lodged in suitable metal caps that are attached to the side walls of the radiant heater reflector or other suitable stand.

This arrangement provides an improved support which not only acts as an electric insulator between the tubular member of the electric heater and the metallic reflector able to withstand relatively high temperatures, but it also has shock-absorbing means which is adapted to protect glass parts of the heating element from mechanical shock to which the apparatus may be subjected during use.

Further details of this invention will be apparent to those skilled in the art to which it relates from the following specification, claims and drawing in which briefly:

Fig. 1 is a perspective view of a tubular heating element employing this improved support;

Fig. 2 is a view partially in section of one end of the heating element and is taken along the line 2—2 of Fig. 1; and Fig. 3 is a sectional view taken along the line 3—3 of Fig. 2.

Referring to the drawing in detail, there is illustrated a tubular type heating element 10, the ends of which are lodged in cup-shaped metallic supporting members 11 and 12. One of these members 12 is shown in cross section in Fig. 2. A cup-shaped spacing member 13 is provided inside of each of the metallic members 11 and 12 to space each end of the tubular heating element 10 therefrom as shown in Fig. 1.

The heating element 10 comprises an outer tube 14 which may be made of vitreous material, such as fused quartz, "Pyrex" or the like. Inside of this tube 14 is another tube 14a which may be made of similar material and the tubes 14 and 14a are separated by a layer of granular material 14b or material such as silicon carbide. The resistance element 14c which is in the shape of a helix is positioned inside of the tubular member 14a and is prevented from sagging against this latter member by means of the granular or powdered material 14d which may be aluminum oxide. The granular material 14d is a flowable semi-solid material that does not fill all of the space around the resistance element 14c inside of the tube 14a. This material is therefore in a relatively loose condition to allow for expansion during heating and also to permit it to shift inside of the tubular member 14a when the heating unit is oriented to different positions. This granular material therefore functions to prevent the resistance element 14c from sagging against the inner wall of the member 14a even though the convolutions of the helical form of the resistance element 14c extend relatively close to the inner wall of the tubular member 14a.

Each end of the heating element is provided with suitable plugs such as plugs 14e and 14f, which are made by suitably binding together fibrous material, such as asbestos, using suitable binders. One of these plugs 14e is positioned in the end of the tubular member 14a which does not extend all the way to the end of the tubular member 14 so that the other plug 14f may be positioned in the end of this latter tubular member 14. The inner surface of the plug 14f then is made to abut the plug 14e and also the end of the tubular member 14a. The plug 14f also seals the end of the annular cavity in which the granular material 14d is positioned.

The wire 14g which is connected to one end of the resistance element 14c by brazing, silver soldering or the like, is positioned inside of a suitable sleeve 14h which passes through the plugs 14c and 14f. The wire 14g and the sleeve 14h are, of course, sealed into these plugs 14e and 14f during the assembly of the heating element, at which time the material of the plugs 14e and 14f is of paste-like consistency. After assembly of the various parts of the heating element, the unit is permitted to set, during which time these plugs 14e and 14f harden and grip the inside walls of the tubular member 14a and 14 respectively and these tubular members are thus effectively sealed.

The cup-shaped members 13, which are of resilient material such as silicone rubber, are shaped to fit loosely over the ends of the frangible tubular member 14 of the heating element. These resilient members are adapted to withstand the heat generated by the heating unit without deleterious effect thereon, and they are also adapted to serve as electrical insulators between the heating element and the metal caps 11 and 12. The metal caps 11 and 12 in turn fit loosely over the silicone rubber members 13 and the whole assembly is held together, that is, the metal caps 11 and 12 are held on the rubber cup-shaped members by means of the frame 15 illustrated partially in Fig. 2, to which the metal caps 11 and 12 are adapted to be attached by screws such as the screw 76. Where desired, the end position of the caps 11 and 12 may be made integral with the wall member 15 of the heater reflector and screws such as the screw 16 may be dispensed with.

The silicone rubber cup-shaped members or pads 13 withstand long periods of use without losing their resilience and they are therefore well suited to act as mechanical shock absorbers to protect the frangible tubes 14 and 14a as well as the other parts from mechanical shock. They also reduce effects of clamping pressures that may be placed on the tubular members 14 and 14a by the frame member so that strains in these members that might result from such stresses are minimized which results in longer life for these members even with repeated heating and cooling thereof.

While I have shown a preferred embodiment of the invention it will be understood that the invention is capable of variation and modification from the form shown so that its scope should be limited only by the scope of the claims appended hereto.

I claim:

1. An electrical heating element comprising a frame member, tube means of vitreous material, a heating element made of a plurality of convolutions of an elongated electrical conductor positioned in said tube means, granular material surrounding said heating element for spacing said element from an inner wall of said tube means, electrical connection means connected to said heating element for supplying an electric current thereto, means for sealing the ends of said tube means to confine said heating element and said granular material therein, cup-shaped members of resilient electrical insulating and heat resistant material positioned one over each end of said tube means, opposing rigid caps positioned one over each of said resilient cup-shaped members at opposite ends of said tube means said cup-shaped members snugly engaging the outer surfaces of said cup-shaped members, and means for attaching said rigid caps to said frame member whereby said tube means is clamped between said opposing rigid cap members and supported thereby.

2. An electrical heating element comprising a frame member, tube means of vitreous material, a heating element made up of a plurality of convolutions of an elongated electrical conductor positioned in said tube means, granular material surrounding said heating element for spacing said element from an inner wall of said tube means, electrical connection means connected to said heating element for supplying an electric current thereto, means for sealing the ends of said tube means to confine said heating element and said granular material therein, supporting means attached to said frame member for supporting the ends of said tube means in a slidable manner so that said tube means may expand and contract with respect to said supporting means, said supporting means comprising cup-shaped members of resilient electrical insulating and heat resistant material snugly positioned one over each end of said tube means so that said tube means is permitted slight movement due to expansion or contraction of said tube means or said frame member, opposing rigid caps positioned one over each of said resilient cup-shaped members at opposite ends of said tube means, said caps snugly engaging the outer surfaces of said cup-shaped members and also permitting slight movement therebetween, and means for attaching said caps to said frame member.

References Cited in the file of this patent

UNITED STATES PATENTS

| | | |
|---|---|---|
| 2,463,924 | Van Orden | Mar. 8, 1949 |
| 2,513,940 | Huetten | July 4, 1950 |
| 2,529,279 | Breisch | Nov. 7, 1950 |
| 2,544,554 | Holmes | Mar. 6, 1951 |
| 2,690,491 | Calvert | Sept. 28, 1954 |
| 2,703,834 | Charbonneau | Mar. 8, 1955 |
| 2,728,546 | Degiers | Dec. 27, 1955 |